(12) United States Patent
Kang et al.

(10) Patent No.: US 10,131,850 B2
(45) Date of Patent: Nov. 20, 2018

(54) NAPHTHA AND METHANOL MIXED CATALYTIC CRACKING REACTION PROCESS

(71) Applicant: Korea Research Institute of Chemical Technology, Daejeon (KR)

(72) Inventors: Na Young Kang, Daejeon (KR); Yong Ki Park, Seoul (KR); Won Choon Choi, Daejeon (KR); Dae Jin Kim, Daejeon (KR); Hwi Min Seo, Daejeon (KR); Sunyoung Park, Gyeonggi-do (KR); Joo Hyeong Oh, Gyeonggi-do (KR); Sin Cheol Kang, Seoul (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 102 days.

(21) Appl. No.: 15/501,006

(22) PCT Filed: Jul. 30, 2015

(86) PCT No.: PCT/KR2015/007989
§ 371 (c)(1),
(2) Date: May 24, 2017

(87) PCT Pub. No.: WO2016/018097
PCT Pub. Date: Feb. 4, 2016

(65) Prior Publication Data
US 2017/0253811 A1 Sep. 7, 2017

(30) Foreign Application Priority Data

Aug. 1, 2014 (KR) .......... 10-2014-0098863
Jul. 28, 2015 (KR) .......... 10-2015-0106710

(51) Int. Cl.
*C10G 11/18* (2006.01)
*C10G 3/00* (2006.01)

(52) U.S. Cl.
CPC .............. *C10G 11/182* (2013.01); *C10G 3/42* (2013.01); *C10G 3/57* (2013.01); *C10G 3/62* (2013.01); *C10G 11/18* (2013.01); *C10G 2400/20* (2013.01); *Y02P 20/582* (2015.11); *Y02P 30/40* (2015.11); *Y02P 30/446* (2015.11)

(58) Field of Classification Search
CPC ............ B01D 2053/221; B01D 53/225; B01D 53/226; B01D 71/06; B01D 71/68; C07C 9/04; C10L 2290/06; C10L 2290/548; C10L 3/104; C10G 2300/1044; C10G 2400/20; C10G 11/05; C10G 11/18; C10G 11/10; C10G 3/49
See application file for complete search history.

(56) References Cited

U.S. PATENT DOCUMENTS

| | | | |
|---|---|---|---|
| 7,230,151 B2 * | 6/2007 | Martens | C07C 1/20 585/324 |
| 7,601,663 B2 | 10/2009 | Choi et al. | |
| 7,663,013 B2 | 2/2010 | Choi et al. | |
| 8,608,944 B2 * | 12/2013 | Li | C07C 4/06 208/107 |
| 9,284,235 B2 | 3/2016 | Liu et al. | |
| 2014/0051900 A1 | 2/2014 | Liu et al. | |

FOREIGN PATENT DOCUMENTS

| | | |
|---|---|---|
| CN | 102875285 A | 1/2013 |
| CN | 102875304 A | 1/2013 |
| KR | 20060023783 A | 3/2006 |
| KR | 1020060073940 A | 6/2006 |
| KR | 100651329 B1 | 11/2006 |
| KR | 20080078865 A | 8/2008 |
| KR | 1020090057027 A | 6/2009 |
| KR | 20130106872 A | 9/2013 |
| WO | 2013/121433 A1 | 8/2013 |

OTHER PUBLICATIONS

A. Martin et al., Coupled Conversion of Methanol and C4 Hydrocarbons to Lower Olefins, Applied Catalysis, Jan. 1989, 149-155, Elsevier Science Publishers B.V., Amsterdam, Netherlands.
International Search Report dated Dec. 3, 2016, for PCT/KR2015/007989.
H.T. Yan et al., Mixed Naphtha/Methanol Feed Used in the Thermal Catalytic/Steam Cracking (TCSC) Process for the Production of Propylene and Ethylene, Catalyst Letters, May 2011, Springer, Berlin, Germany.

* cited by examiner

*Primary Examiner* — Sharon Pregler
(74) *Attorney, Agent, or Firm* — Bachman & LaPointe, P.C.

(57) ABSTRACT

A naphtha and methanol mixed catalytic cracking reaction process involves a simultaneous cracking reaction of naphtha and methanol using a circulating fluidized-bed reactor comprising a reactor, a stripper, and a regenerator. The naphtha is supplied from the bottom part of the reactor at a position between 0%~5% of the total length of the reactor, and the methanol is supplied from the bottom part of the reactor at a position between 10%~80% of the total length of the reactor. The catalytic cracking reaction process uses the circulating fluidized-bed reactor and can crack naphtha and methanol simultaneously by having different introduction positions for the naphtha and methanol in the reactor, which is advantageous for heat neutralization, so that energy consumption can be minimized and also the yield of light olefins can be improved by suppressing the production of light saturated hydrocarbons such as methane, ethane and propane.

17 Claims, 3 Drawing Sheets

NAPHTHA AND METHANOL MIXED CATALYTIC CRACKING REACTION PROCESS

BACKGROUND OF THE INVENTION

The present invention relates to a method for preparing light olefins such as ethylene and propylene through a naphtha and methanol mixed catalytic cracking reaction process involving a simultaneous cracking reaction of naphtha and methanol by using a circulating fluidized-bed reactor.

Light olefins such as ethylene and propylene are basic raw materials in the field of petrochemical industry and produced mostly from naphtha by high temperature pyrolysis process performed at over 800° C. At this time, the process is endothermic reaction, indicating the energy consumption is huge. Recently, according to the increase of natural gas cracker selectively producing ethylene, the competitiveness of naphtha cracker decreases. So, it is required to develop a novel method for producing olefins that can produce propylene selectively.

Recently, Korea Research Institute of Chemical Technology, SK Innovation, and KBR have developed ACO™ (Advanced Catalytic Olefins) process, the catalytic naphtha cracking process, that can increase the yield of propylene at least 100%, compared with the conventional pyrolysis process (Korean Patent No. 10-0651329 and Korean Patent No. 10-0632563).

In the meantime, MTO (Methanol to Olefin) technology has been introduced as a novel technology to prepare olefins, wherein methanol is produced from coal or natural gas through gasification or reforming and light olefins are produced from the obtained methanol above. The pyrolysis process of naphtha to produce light olefins is endothermic reaction, while MTO reaction to produce light olefins from methanol is exothermic reaction. So, during the reaction, a huge amount of heat is generated, which has to be eliminated. MTO process has been developed by UOP, USA, and DICP, China, etc, and is now in full operation for the industrial production of olefins.

As mentioned above, hydrocarbon cracking process is endothermic reaction and methanol cracking process is exothermic reaction. So, a coupling reaction of the two processes above is proposed for heat neutralization. According to Nowak et al., heat neutralization is possible if C4 hydrocarbon is added in the course of methanol conversion process (Appl. Catal. A, 50, (1989) 149-155). When methanol and n-butane are added at the ratio of 1:3 to the process, cracking reaction for the production of light olefins can be induced without additional energy supply or elimination.

However, methanol cracking process progresses faster than naphtha, the hydrocarbon, cracking process. Therefore, a simple coupling reaction of the two is disadvantage in increasing yield of light olefins due to the generation of many by-products.

Thus, the present inventors studied about naphtha and methanol mixed catalytic cracking reaction process involving a simultaneous cracking reaction of naphtha and methanol. In the course of the study, the inventors found out that the yield of light olefins could be increased by performing the naphtha and methanol cracking reaction simultaneously by using a circulating fluidized-bed reactor and by regulating the introduction positions of naphtha and methanol in the reactor, leading to the completion of the present invention.

SUMMARY OF THE INVENTION

It is an object of the present invention to provide a method to increase the yield of light olefins with minimizing the generation of light saturated hydrocarbons such as methane, ethane, and propane accompanied due to the rapid cracking reaction of methanol in the naphtha and methanol mixed catalytic cracking reaction process.

To achieve the above object, the present invention provides a naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

The present invention also provides light olefins produced by the naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

In addition, the present invention provides a method for increasing the yield of light olefins via the naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

The catalytic cracking reaction process provided by the invention uses the circulating fluidized-bed reactor and can crack naphtha and methanol simultaneously by having different introduction positions for the naphtha and methanol in the reactor, which is advantageous for heat neutralization, so that energy consumption can be minimized and also the yield of light olefins can be improved by suppressing the production of light saturated hydrocarbons such as methane, ethane and propane.

BRIEF DESCRIPTION OF THE DRAWINGS

The application of the preferred embodiments of the present invention is best understood with reference to the accompanying drawings, wherein.

DETAILED DESCRIPTION

Hereinafter, the present invention is described in detail.

The present invention provides a naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

Figure 1:
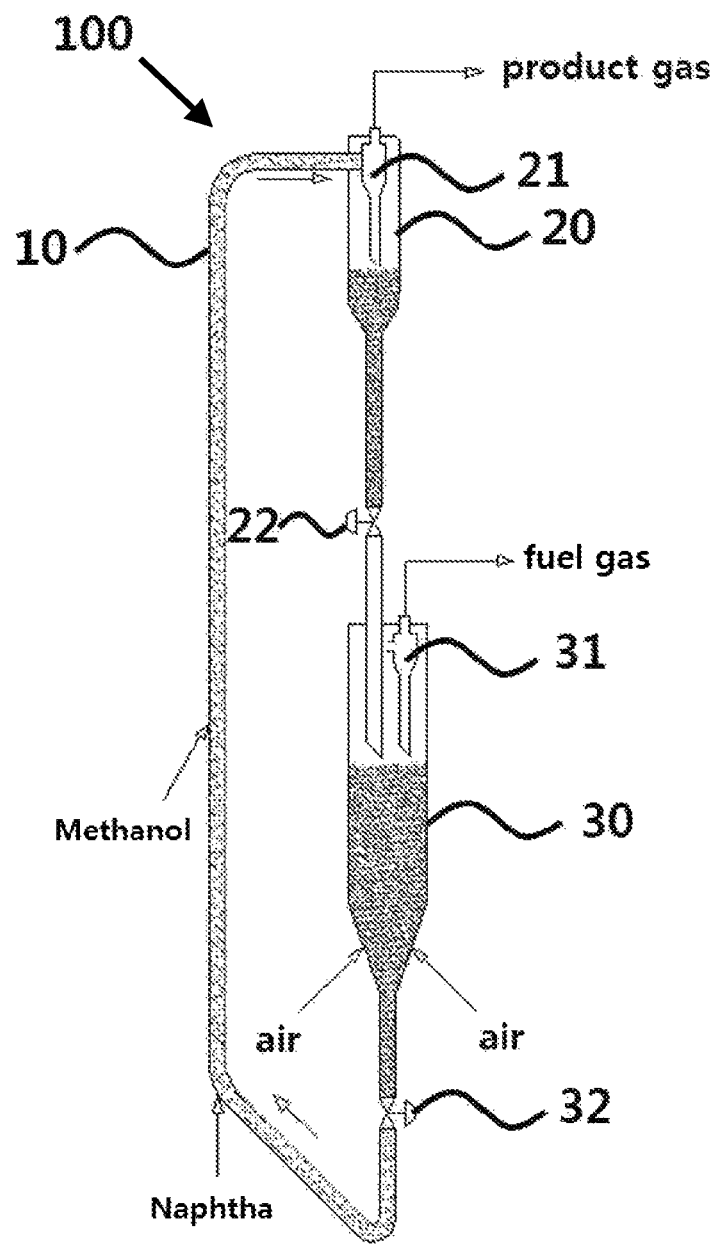
FIG. 1 is a schematic diagram illustrating an example of the circulating fluidized-bed reactor used in the catalytic cracking reaction process of the invention.

At this time, an example of the circulating fluidized-bed reactor performing the naphtha and methanol mixed catalytic cracking reaction process is presented in FIG. 1.

Hereinafter, with referring to the schematic diagram of FIG. 1 illustrating an example of the circulating fluidized-bed reactor, the cracking reaction process of the present invention is described in more detail.

The conventional techniques and methods have been focused only on the realization of heat neutralization in order to increase energy efficiency in the simultaneous cracking reaction of naphtha and methanol that are different in reaction speed and reaction heat. However, this proposed idea only for heat neutralization is not enough to obtain light olefins with high yield after the simultaneous introduction of the two reactants, and thus it is required to regulate the contact time precisely with considering the reaction speed of each reactant.

To overcome the said problem, the present invention used a circulating fluidized-bed reactor and regulated the introduction positions of hydrocarbon and methanol in order to control the contact timing between both naphtha and methanol and a catalyst more precisely.

If the contact time between a reactant and a catalyst is short in the course of cracking reaction of naphtha and methanol, the cracking reaction would not be going smooth and the intermediate products, light olefins such as ethylene and propylene, would not be fully cracked. On the other hand, if the contact time between the two is too long, side reaction would be induced, resulting in the large volume of unwanted by-products. Therefore, it is important to regulate the contact time between a reactant and a catalyst.

In particular, the cracking speed of methanol is at least 10 times faster than that of naphtha, the hydrocarbon. If the two reactants are introduced at the same time, methanol would stay longer so that the production of light saturated hydrocarbons such as methane, ethane, and propane and the production of BTX would increase. To solve the problem, it is required to make the stay of methanol short, for which the introduction positions of naphtha and methanol are preferably adjusted.

The circulating fluidized-bed reactor (100) used in the catalytic cracking reaction process of the invention preferably comprises a reactor (10), a stripper (20), and a regenerator (30).

The reactor (10) herein can be preferably a riser. The riser is preferably 5~15 m in length and ¼~1 inch in diameter, but not always limited thereto. The reactor (10) can also include tubes through which naphtha and methanol are supplied. Since the introduction positions of naphtha and methanol in the catalytic cracking reaction process of the invention are varied, so that the tubes for the supply of naphtha and methanol are separately formed.

The stripper (20) can contain a cylinder (21) to discharge the product gas generated from naphtha and methanol. The regenerator (30) is located below the stripper, and the reactor can additionally include a valve (22) for separating the stripper and the regenerator and regulating the circulation flow of the catalyst and the fuel gas.

The regenerator (30) can contain a cylinder (31) to discharge fuel gas (naphtha and methanol). The regenerator is filled with a catalyst and is equipped with a tube at the lower part, through which air is supplied. The reactor (10) is preferably connected to the lower part of the regenerator. The regenerator can also include a valve (32) to divide the regenerator and the reactor and to regulate the circulation of the catalyst and fuel gas.

In the catalytic cracking reaction process of the present invention, a circulating fluidized-bed reactor is used to crack naphtha and methanol simultaneously. At this time, naphtha is supplied to the lower part of the reactor and methanol is supplied to a different position apart from the lower part. The introduction position of methanol can vary from the reaction temperature, the volume of a circulating catalyst, and the introduction amount of the reactant, and can be preferably at the position between 10%~80% by the total length of the reactor from the lower part. The different introduction positions can achieve heat neutralization and can increase the yield of light olefins best.

To regulate the contact time of naphtha and methanol with a catalyst more precisely, naphtha is supplied from the lower part of the reactor at a position between 0%~5% of the total length of the reactor. In the meantime, methanol is supplied from the lower part of the reactor at a position between 10%~80% of the total length of the reactor. More preferably, methanol is supplied from the lower part of the reactor at a position between 15%~45% of the total length of the reactor.

At this time, the naphtha used as the reactant can contain $C_4$~$C_{12}$ saturated hydrocarbon or unsaturated hydrocarbon, which is exemplified by full-range naphtha, light naphtha, raffinate oil, and a mixture thereof. Unlike the pyrolysis process using saturated hydrocarbon only, hydrocarbon containing olefins can be used as the reactant in the circulating fluidized-bed catalytic cracking process.

In the meantime, the methanol used as the reactant herein can be not only anhydrous methanol but also methanol containing moisture up to 20%.

In the circulating fluidized-bed reactor (100), a catalyst is circulated. At this time, the catalyst is preferably a zeolite catalyst. More precisely, the catalyst can be a molded spherical or oval catalyst of 20~200 μm in diameter comprising ZSM-5 or SAPO-34 as a catalyst component, a binder and a matrix, but not always limited thereto.

Further, the supply ratio of naphtha and methanol is preferably 1 (weight part):0.2~1.4 (weight part). If the supply ratio of naphtha and methanol is less than 1:0.2, the calorific value due to the exothermic reaction of methanol would be reduced so that the energy consumption for maintaining the reaction temperature would be increased. On the other hand, if the supply ratio of naphtha and methanol is more than 1:1.4, the amount of by-products such as CO and $CH_4$ would be increased.

It is also preferred to induce reaction of naphtha and methanol at the temperature of 600~700° C. at the space velocity of 5 $h^{-1}$~30 $h^{-1}$. The retention time of naphtha and methanol in the reactor is preferably 1~5 seconds. If the reaction temperature of naphtha and methanol is lower than 600° C., the conversion rate would be lowered, indicating that the yield of a target product would be dropped quickly. If the temperature is higher than 700° C., most of the reactants would be converted into coke, resulting in the decrease of the yield of a target product. If the space velocity of the reaction of naphtha and methanol is less than 5 $h^{-1}$, the production of coke is accelerated due to the fast conversion of methanol. On the other hand, if the space velocity is higher than 30 $h^{-1}$, the conversion rate of naphtha would be significantly reduced.

The present invention also provides light olefins produced by the naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

The catalytic cracking reaction process provided by the invention uses the circulating fluidized-bed reactor and can crack naphtha and methanol simultaneously by having different introduction positions for the naphtha and methanol in the reactor, which is advantageous for heat neutralization, so that energy consumption can be minimized and also the yield of light olefins can be improved by suppressing the production of light saturated hydrocarbons such as methane, ethane and propane. Thus, the prepared light olefins thereby can be used economically.

In addition, the present invention provides a method for increasing the yield of light olefins via the naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

Hereinafter, the method to increase the yield of light olefins of the present invention is described in more detail.

The conventional techniques and methods have been focused only on the realization of heat neutralization in order to increase energy efficiency in the simultaneous cracking reaction of naphtha and methanol that are different in reaction speed and reaction heat. However, this proposed idea only for heat neutralization is not enough to obtain light olefins with high yield after the simultaneous introduction of the two reactants, and thus it is required to regulate the contact time precisely with considering the reaction speed of each reactant.

To overcome the said problem, the present invention used a circulating fluidized-bed reactor and regulated the introduction positions of hydrocarbon and methanol in order to control the contact time between both naphtha and methanol and a catalyst more precisely.

If the contact time between a reactant and a catalyst is short in the course of cracking reaction of naphtha and methanol, the cracking reaction would not be going smooth and the intermediate products, light olefins such as ethylene and propylene, would not be fully cracked. On the other hand, if the contact time between the two is too long, side reaction would be induced, resulting in the large volume of unwanted by-products. Therefore, it is important to regulate the contact time between a reactant and a catalyst.

In particular, the cracking speed of methanol is at least 10 times faster than that of naphtha, the hydrocarbon. If the two reactants are introduced at the same time, methanol would stay longer so that the production of light saturated hydrocarbons such as methane, ethane, and propane and the production of BTX would increase. To solve the problem, it is required to make the stay of methanol short, for which the introduction positions of naphtha and methanol are preferably adjusted.

The circulating fluidized-bed reactor (100) used in this invention to increase the yield of light olefins preferably contains a reactor (10), a stripper (20), and a regenerator (30).

The reactor (10) herein can be preferably a riser. The riser is preferably 5~15 m in length and ¼~1 inch in diameter, but not always limited thereto. The reactor (10) can also include tubes through which naphtha and methanol are supplied. Since the introduction positions of naphtha and methanol in the catalytic cracking reaction process of the invention are varied, so that the tubes for the supply of naphtha and methanol are separately formed.

The stripper (20) can contain a cylinder (21) to discharge the product gas generated from naphtha and methanol. The regenerator (30) is located below the stripper, and the reactor can additionally include a valve (22) for separating the stripper and the regenerator and regulating the circulation flow of the catalyst and the fuel gas.

The regenerator (30) can contain a cylinder (31) to discharge fuel gas (naphtha and methanol). The regenerator is filled with a catalyst and is equipped with a tube at the lower part, through which air is supplied. The reactor (10) is preferably connected to the lower part of the regenerator. The regenerator can also include a valve (32) to divide the regenerator and the reactor and to regulate the circulation of the catalyst and fuel gas.

In the method to increase the yield of light olefins of the present invention, a circulating fluidized-bed reactor is used to crack naphtha and methanol simultaneously. At this time, naphtha is supplied to the lower part of the reactor and methanol is supplied to a different position apart from the lower part. The introduction position of methanol can vary from the reaction temperature, the volume of a circulating catalyst, and the introduction amount of the reactant, and can be preferably at the position between 10%~80% by the total length of the reactor from the lower part. The different introduction positions can achieve heat neutralization and can increase the yield of light olefins best.

To regulate the contact time of naphtha and methanol with a catalyst more precisely, naphtha is supplied from the lower part of the reactor at a position between 0%~5% of the total length of the reactor. In the meantime, methanol is supplied from the lower part of the reactor at a position between 10%~80% of the total length of the reactor. More preferably, methanol is supplied from the lower part of the reactor at a position between 15%~45% of the total length of the reactor.

At this time, the naphtha used as the reactant can contain $C_4$~$C_{12}$ saturated hydrocarbon or unsaturated hydrocarbon, which is exemplified by full-range naphtha, light naphtha, raffinate oil, and a mixture thereof. Unlike the pyrolysis process using saturated hydrocarbon only, hydrocarbon containing olefins can be used as the reactant in the circulating fluidized-bed catalytic cracking process.

In the meantime, the methanol used as the reactant herein can be not only anhydrous methanol but also methanol containing moisture up to 20%.

In the circulating fluidized-bed reactor (100), a catalyst is circulated. At this time, the catalyst is preferably a zeolite catalyst. More precisely, the catalyst can be a molded spherical or oval catalyst of 20~200 μm in diameter comprising ZSM-5 or SAPO-34 as a catalyst component, a binder and a matrix, but not always limited thereto.

Further, the supply ratio of naphtha and methanol is preferably 1 (weight part):0.2~1.4 (weight part). If the supply ratio of naphtha and methanol is less than 1:0.2, the calorific value due to the exothermic reaction of methanol would be reduced so that the energy consumption for maintaining the reaction temperature would be increased. On the other hand, if the supply ratio of naphtha and methanol is more than 1:1.4, the amount of by-products such as CO and $CH_4$ would be increased.

It is also preferred to induce reaction of naphtha and methanol at the temperature of 600~700° C. at the space velocity of 5 $h^{-1}$~30 $h^{-1}$. The retention time of naphtha and methanol in the reactor is preferably 1~5 seconds. If the reaction temperature of naphtha and methanol is lower than 600° C., the conversion rate would be lowered, indicating that the yield of a target product would be dropped quickly. If the temperature is higher than 700° C., most of the reactants would be converted into coke, resulting in the decrease of the yield of a target product. If the space velocity of the reaction of naphtha and methanol is less than 5 $h^{-1}$, the production of coke is accelerated due to the fast conversion of methanol. On the other hand, if the space velocity is higher than 30 $h^{-1}$, the conversion rate of naphtha would be significantly reduced.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Examples 1~4

Catalytic Cracking Reaction Processes 1~4

To perform the catalytic cracking reaction process according to the present invention, a circulating fluidized-bed reactor was prepared as shown in the schematic diagram of FIG. 1.

The said circulating fluidized-bed reactor is composed of a reactor, a stripper, and a regenerator, and is 7 m in length and ½ inch in diameter.

At this time, ACO-100 comprising HZSM-5 at 40 weight % which is used for ACO™ process is used as a catalyst. To investigate the characteristics of E-cat, steaming was performed at 800° C. for 24 hours in 100% steam atmosphere, and then 3 kg of the catalyst was loaded in the regenerator.

To introduce the two reactants, naphtha and methanol (MeOH), at different positions, methanol introduction nozzles were equipped at different positions (positions of 20%, 40%, 60%, and 80% of the total length of the rector from the lower part). The naphtha introduced in the reactor was light naphtha. The weight ratio of light naphtha and methanol was 1:0.25.

Naphtha introduction position was located at the lower part of the reactor and methanol introduction positions were set differently at the positions of 20%, 40%, 60%, and 80% of the total length of the reactor from the lower part of the reactor.

The reactor inlet temperature was 690° C. and the Cat/Oil ratio was 25.

Comparative Example 1

The circulating fluidized-bed reactor used in Examples 1~4 was used herein.

At this time, the naphtha introduced in the reactor was light naphtha, and the weight ratio of light naphtha and methanol was 1:0.25.

Naphtha and methanol were supplied into the lower part of the reactor.

The reactor inlet temperature was 690° C. and the Cat/Oil ratio was 25.

Comparative Example 2

The circulating fluidized-bed reactor used in Examples 1~4 was used herein.

At this time, the naphtha introduced in the reactor was light naphtha, and methanol was not supplied.

Naphtha was supplied into the lower part of the reactor.

The reactor inlet temperature was 690° C. and the Cat/Oil ratio was 35.

Experimental Example 1

Investigation of Heat Neutralization According to the Simultaneous Introduction of Naphtha and Methanol To investigate the heat neutralization in the course of naphtha and methanol simultaneous cracking reaction according to the catalytic cracking reaction process of the invention, the catalytic cracking reaction process was performed by the same manners as described in Comparative Example 1. Methanol was supplied with changing the volume from 0 weight % to 100 weight % by the weight of light naphtha. The difference in the temperature between the reactor inlet and outlet was observed. The results are shown in FIG. 2.

Figure 2:
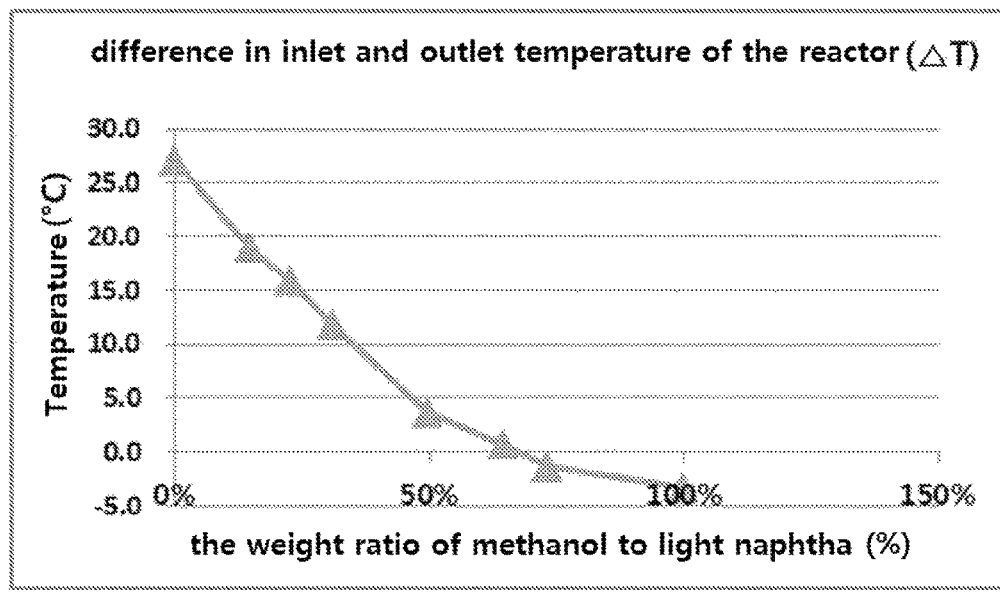
FIG. 2 is a graph illustrating the difference in inlet and outlet temperature of the reactor while the weight ratio of methanol to light naphtha was changed from 0% to 100% in the course of the catalytic cracking reaction process under the same conditions as described in Comparative Example 1.

As shown in FIG. 2, it was confirmed that when the weight ratio of methanol to light naphtha was about 60 weight %, heat neutralization with zero energy consumption was occurred. Therefore, the catalytic cracking process of the invention could make it possible to ensure the heat neutralization and to crack naphtha and methanol simultaneously.

Experimental Example 2

Investigation of the Effect According to the Different Methanol Introduction Positions To investigate the changes according to the different methanol introduction positions in the catalytic cracking reaction process of the present invention, the processes of Examples 1~4 and Comparative Examples 1~2 were performed, during which the yield of methanol, the yield of light olefins, and the temperature of the reactor were analyzed. The results are shown in FIGS. 3~5.

Figure 3:
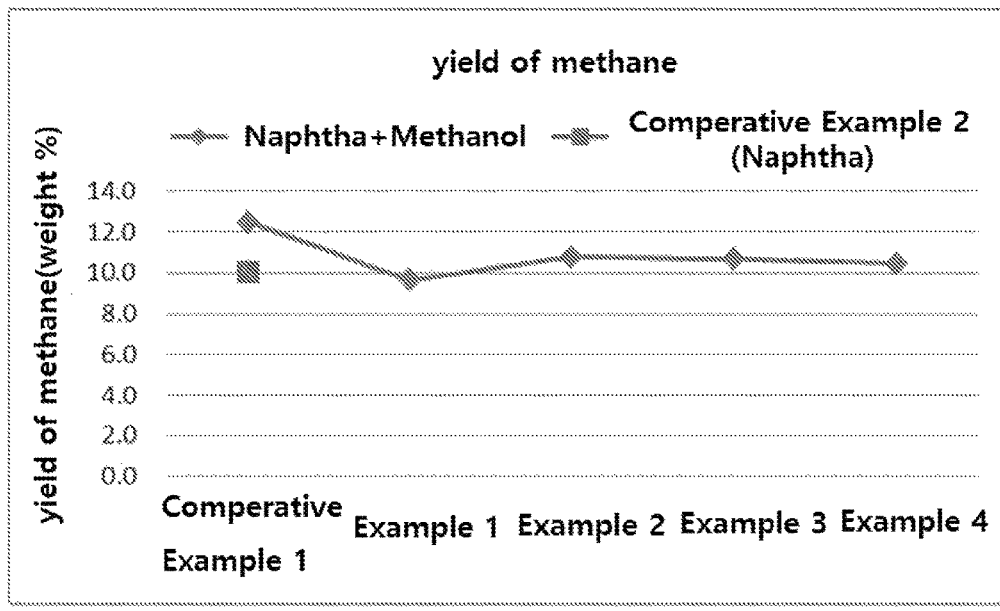
FIG. 3 is a graph illustrating the yield of methane of the processes of Examples 1~4 and Comparative Examples 1 and 2 of the present invention.
Figure 4:
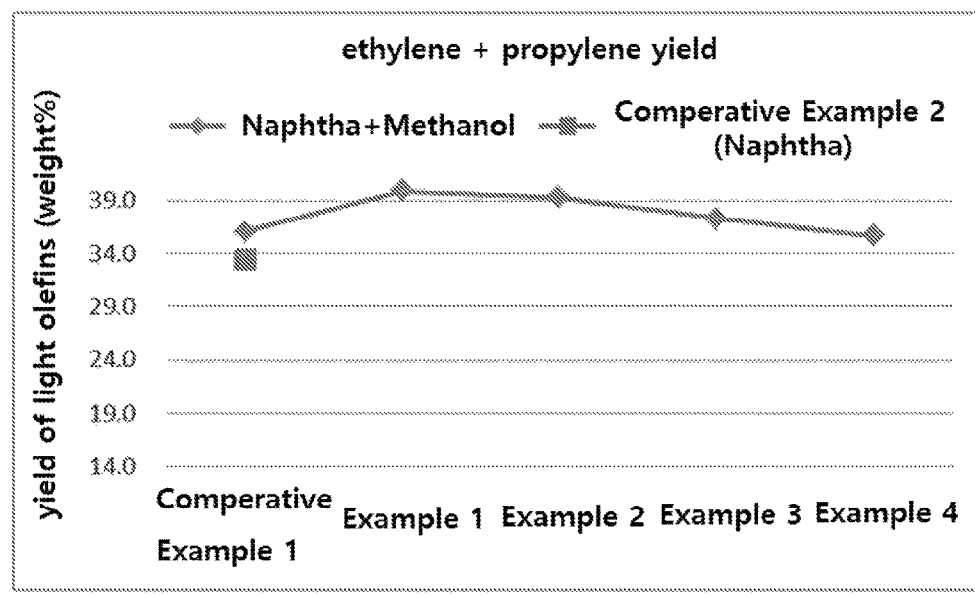
FIG. 4 is a graph illustrating the yield of light olefins of the processes of Examples 1~4 and Comparative Examples 1 and 2 of the present invention.
Figure 5:
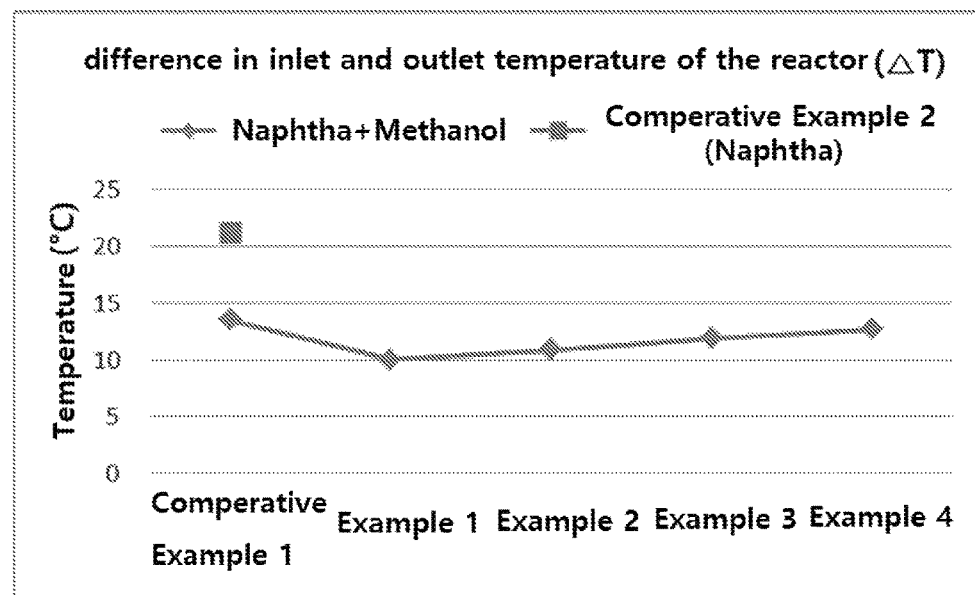
FIG. 5 is a graph illustrating the changes of the reactor temperature after the processes of Examples 1~4 and Comparative Examples 1 and 2 of the present invention.

As shown in FIGS. 3~5, in Comparative Example 2 wherein light naphtha alone was cracked, the temperature of the reactor (ΔT) was 21° C. and the yield of light olefins was 33.5 weight %. In the meantime, the yield of methanol was approximately 10 weight %.

In Comparative Example 1 wherein naphtha (hydrocarbon) and methanol were cracked simultaneously, the temperature of the reactor was reduced but the yield of light olefins was increased. The yield of methanol was significantly increased up to 13 weight %.

In Examples 1~4 wherein the methanol introduction positions were regulated in the course of the catalytic cracking reaction process of the invention, the yield of methanol was hardly increased and the temperature of the reactor was maintained equally.

In particular, the yield of light olefins (ethylene+propylene) was approximately 40 weight % at maximum, which was increased by 15 weight % compared with that of the case wherein naphtha and methanol were supplied simultaneously into the lower part of the reactor.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

2. The naphtha and methanol mixed catalytic cracking reaction process according to claim 1, wherein the methanol is supplied into the lower part of the reactor at a position between 15%~45% of the total length of the reactor.

3. The naphtha and methanol mixed catalytic cracking reaction process according to claim 1, wherein the naphtha contains $C_4$~$C_{12}$ saturated hydrocarbon or unsaturated hydrocarbon.

4. The naphtha and methanol mixed catalytic cracking reaction process according to claim 1, wherein the naphtha is one or more materials selected from the group consisting of full-range naphtha, light naphtha, raffinate oil, and a mixture thereof.

5. The naphtha and methanol mixed catalytic cracking reaction process according to claim 1, wherein the catalyst is circulated in the circulating fluidized-bed reactor and at this time the catalyst is a molded spherical or oval catalyst of 20~200 μm in diameter comprising ZSM-5 or SAPO-34 as a catalyst component, a binder and a matrix, but not always limited thereto.

6. The naphtha and methanol mixed catalytic cracking reaction process according to claim 1, wherein the supply ratio of naphtha and methanol is 1 weight part:0.2~1.4 weight part.

7. The naphtha and methanol mixed catalytic cracking reaction process according to claim 1, wherein the cracking reaction of naphtha and methanol is performed at the temperature of 600~700° C. and at the space velocity of 5 $h^{-1}$~30 $h^{-1}$.

8. The naphtha and methanol mixed catalytic cracking reaction process according to claim 1, wherein the retention time of naphtha and methanol in the reactor is 1~5 seconds.

9. A method for increasing the yield of light olefins via the naphtha and methanol mixed catalytic cracking reaction process involving a simultaneous cracking reaction of naphtha and methanol using a circulating fluidized-bed reactor comprising a reactor, a stripper, and a regenerator, wherein the naphtha is supplied from the bottom part of the reactor at a position between 0%~5% of the total length of the reactor, and the methanol is supplied from the bottom part of the reactor at a position between 10%~80% of the total length of the reactor.

10. The method according to claim 9, wherein the position between 15%~45% of the total length of the reactor.

11. The method according to claim 9, wherein the catalyst is circulated in the circulating fluidized-bed reactor and at this time the catalyst is a molded spherical or oval catalyst of 20~200 μm in diameter comprising ZSM-5 or SAPO-34 as a catalyst component, a binder and a matrix, but not always limited thereto.

12. The method according to claim 9, wherein the supply ratio of naphtha and methanol is 1 weight part:0.2~1.4 weight part.

13. The method according to claim 9, wherein the cracking reaction of naphtha and methanol is performed at the temperature of 600~700° C. and at the space velocity of 5 $h^{-1}$~30 $h^{-1}$.

14. The method according to claim 9, wherein the retention time of naphtha and methanol in the reactor is 1~5 seconds.

15. The naphtha and methanol mixed catalytic cracking reaction process according to claim 5, wherein the supply ratio of naphtha and methanol is 1 weight part:0.2~1.4 weight part.

16. The naphtha and methanol mixed catalytic cracking reaction process according to claim 15, wherein the cracking reaction of naphtha and methanol is performed at the temperature of 600~700° C. and at the space velocity of 5 $h^{-1}$~30 $h^{-1}$.

17. The naphtha and methanol mixed catalytic cracking reaction process according to claim 16, wherein the retention time of naphtha and methanol in the reactor is 1~5 seconds.

* * * * *